(12) United States Patent
Walter

(10) Patent No.: US 6,731,226 B2
(45) Date of Patent: May 4, 2004

(54) AIRPORT FEATURE DISPLAY SYSTEM AND DATA INTERCHANGE METHOD FOR CONFORMAL DISPLAY

(75) Inventor: Randy L. Walter, Ada, MI (US)

(73) Assignee: Smiths Aerospace, Inc., Grand Rapids, MI (US)

( * ) Notice: Subject to any disclaimer, the term of this patent is extended or adjusted under 35 U.S.C. 154(b) by 95 days.

(21) Appl. No.: 10/079,649

(22) Filed: Feb. 20, 2002

(65) Prior Publication Data

US 2003/0102987 A1 Jun. 5, 2003

Related U.S. Application Data (60) Provisional application No. 60/336,752, filed on Dec. 4, 2001, provisional application No. 60/337,182, filed on Dec. 4, 2001, provisional application No. 60/337,192, filed on Dec. 4, 2001, and provisional application No. 60/337,295, filed on Dec. 4, 2001.

(51) Int. Cl.$^7$ .............................................. G01C 23/00
(52) U.S. Cl. ...................... 340/972; 340/973; 340/947; 701/16
(58) Field of Search ................................ 340/947, 948, 340/971, 972, 973, 975, 979, 951, 990; 701/3, 11, 13, 14, 16, 214, 204; 342/33, 34, 64, 118

(56) References Cited

U.S. PATENT DOCUMENTS

| | | | |
|---|---|---|---|
| 3,706,969 A | 12/1972 | Paredes | 340/26 |
| 3,971,025 A | 7/1976 | Levine | 343/108 |
| 4,151,595 A | 4/1979 | Pressiat | 364/439 |
| 4,876,651 A | 10/1989 | Dawson et al. | 364/449 |
| 5,057,835 A | 10/1991 | Factor et al. | 340/995 |
| 5,200,902 A | 4/1993 | Pilley | 364/439 |
| 5,268,698 A | 12/1993 | Smith, Sr. et al. | 342/450 |
| 5,343,395 A | 8/1994 | Watts | 701/16 |
| 5,519,618 A | 5/1996 | Kastner et al. | 364/439 |
| 5,629,691 A | 5/1997 | Jain | 340/961 |
| 5,745,054 A * | 4/1998 | Wilkens | 340/972 |
| 5,831,570 A | 11/1998 | Ammar et al. | 342/26 |
| 5,913,912 A | 6/1999 | Nishimura et al. | 701/35 |
| 5,978,715 A * | 11/1999 | Briffe et al. | 701/11 |
| 6,018,698 A * | 1/2000 | Nicosia et al. | 701/214 |
| 6,112,141 A | 8/2000 | Briffe et al. | 701/14 |
| 6,144,915 A | 11/2000 | Shiomi et al. | 701/120 |
| 6,157,876 A | 12/2000 | Tarleton, Jr. et al. | 701/16 |
| 6,195,609 B1 | 2/2001 | Pilley et al. | 701/120 |
| 6,246,342 B1 | 6/2001 | Vandevoorde et al. | 340/961 |
| 6,282,488 B1 | 8/2001 | Castor et al. | 701/120 |
| 6,314,363 B1 | 11/2001 | Pilley et al. | 701/120 |
| 6,314,370 B1 | 11/2001 | Curtright | 701/213 |
| 6,353,794 B1 | 3/2002 | Davis et al. | 701/201 |
| 6,411,890 B1 | 6/2002 | Zimmerman | 701/120 |
| 6,463,383 B1 | 10/2002 | Baiada et al. | 701/120 |

OTHER PUBLICATIONS

US2002/0120392A1, Stratton et al., Aug. 29, 2002.

* cited by examiner

*Primary Examiner*—Van Trieu
(74) *Attorney, Agent, or Firm*—Price, Heneveld, Cooper, DeWitt & Litton, LLP (57) ABSTRACT

An airport feature display system for aircraft provides visual guidance cues and awareness to track the specified taxi path on a HUD. The guidance cues include symbology representative of the position of selected airport features such as runway and taxiway edges, taxi routes, and airport signage. Data representative of the airport features is communicated between aircraft systems using a data interchange method that facilitates efficient throughput of the large quantities of data required to represent the airport features.

15 Claims, 5 Drawing Sheets

| WORD # | SSM | DATA | RANGE | RESOLUTION | LABEL |
|---|---|---|---|---|---|
| 1 | 01 | AIRPORT LATITUDE COARSE | 20 BITS | .000172 DEG | 044 |
| 2 | 00 | AIRPORT LATITUDE FINE | 11 BITS | 8.38 E-8 DEG | |
| 3 | 00 | AIRPORT LONGITUDE COARSE | 20 BITS | .000172 DEG | |
| 4 | 00 | AIRPORT LONGITUDE FINE | 11 BITS | 8.38 E-8 DEG | |
| 5 | 00 | AIRPORT ID (3 ASCII) | 7 BITS EACH | — | |
| 6 | 10 | AIRPORT ID (1 ASCII) | 7 BITS EACH | — | |

FIG. 3

| WORD # | SSM | DATA | RANGE | RESOLUTION | LABEL |
|---|---|---|---|---|---|
| 1 | 01 | RELATIVE POSITION Y POINT A1 | 18 BITS | .125 FT | 120(ACT), 320(MOD) |
| 2 | 00 | RELATIVE POSITION X POINT A1 | 18 BITS | .125 FT | |
| 3 | 00 | RELATIVE POSITION Z POINT A1 | 18 BITS | .125 FT | |
| 4 | 00 | RELATIVE POSITION Y POINT A2 | 18 BITS | .125 FT | |
| 5 | 00 | RELATIVE POSITION X POINT A2 | 18 BITS | .125 FT | |
| 6 | 00 | RELATIVE POSITION Z POINT A2 | 18 BITS | .125 FT | |
| 7 | 00 | SEG A ICAO IDENT (3 ASCII) | 7 BITS EACH | N/A | |
| 8 | 00 | IDENT CONTINUED (3 ASCII) | 7 BITS EACH | N/A | |
| 9 | 00 | SEGMENT A ATTRIBUTES | BELOW | | |
| 10 | 11 | CONIC B SUBTENDED ANGLE | 12 BITS | .0439 DEGREE | |
| 11 | 11 | CONIC B RADIUS (+ = RIGHT) | 18 BITS | .125 FT | |
| 12 | 11 | CONIC B INITIAL ANGLE | 12 BITS | .0439 DEGREE | |
| 13 | 00 | RELATIVE POSITION Y POINT B1 | 18 BITS | .125 FT | |
| 14 | 00 | RELATIVE POSITION X POINT B1 | 18 BITS | .125 FT | |
| 15 | 00 | RELATIVE POSITION Z POINT B1 | 18 BITS | .125 FT | |
| 16 | 00 | RELATIVE POSITION Y POINT B2 | 18 BITS | .125 FT | |
| 17 | 00 | RELATIVE POSITION X POINT B2 | 18 BITS | .125 FT | |
| 18 | 00 | RELATIVE POSITION Z POINT B2 | 18 BITS | .125 FT | |
| 19 | 00 | SEG B ICAO IDENT (3 ASCII) | 7 BITS EACH | N/A | |
| 20 | 00 | IDENT CONTINUED (3 ASCII) | 7 BITS EACH | N/A | |
| 21 | 00 | SEGMENT B ATTRIBUTES | BELOW | | |
| .. | 10 | .. | | | |

FIG. 4

SEGMENT ATTRIBUTES

ACTIVE INDICATOR -BIT 29
HOLD AT SEGMENT END INDICATOR -BIT 28
SURFACE WIDTH -BITS 27-20, RES, 1 FT
SEGMENT MAX SPEED -BITS 19-12, RES 1 FT
PATH TYPE -BITS 11-9
    RUNWAY  000
    TAXIWAY 001
    RAMP    010
    GATE    011

FIG. 5

| WORD # | SSM | DATA | RANGE | RESOLUTION | LABEL |
|---|---|---|---|---|---|
| 1 | 01 | RELATIVE POSITION Y | 18 BITS | .125 FT | 144 |
| 2 | 00 | RELATIVE POSITION X | 18 BITS | .125 FT | |
| 3 | 00 | ICAO TYPE, ORIENTATION | 8 BITS, 4 BITS | N/A, 22.5° | |
| 4 | 00 | TEXT (3 ASCII) | 7 BITS EACH | — | |
| 5 | 10 | TEXT (3 ASCII) | 7 BITS EACH | — | |

AIRPORT FEATURE DISPLAY SYSTEM AND DATA INTERCHANGE METHOD FOR CONFORMAL DISPLAY

CROSS-REFERENCE TO RELATED APPLICATIONS

This application claims the benefit of U.S. Provisional Application Nos. 60/336,752; 60/337,182; 60/337,192; and 60/337,295, all filed Dec. 4, 2001, the disclosures each of which are hereby incorporated by reference.

BACKGROUND OF THE INVENTION

1. Field of the Invention

The present invention relates to aircraft surface guidance systems (SGS) and, in particular, to a communications interchange for transmitting airport feature data to a conformal display system (e.g., head-up display (HUD)) on an aircraft.

2. Technical Background

There is considerable interest in enhancing surface guidance for aircraft. After an aircraft lands on a runway at an airport, the next step is to taxi the aircraft to a desired destination such as a passenger-loading/unloading gate. A pilot can easily become confused or lost amid the many runways, taxiways, ramps, and buildings that make up an airport. The problem is more significant at large airports and is particularly significant at night when the multitude of lights can make it more difficult to taxi the aircraft to the desired destination.

Efficient taxi operations save time and money. With airports becoming more crowded, aircraft often spend considerable time taxiing between runways and gates. Taxi time is even longer if the pilot makes a wrong turn, becomes lost, or blunders onto the wrong runway or taxiway. In addition, a wrong turn or navigation blunder can cause delays for other aircraft at the airport.

One feature of an airport surface guidance capability is the presentation of airport features such as runways and taxiways that are readily made available to the pilot. One approach to present such feature information is on a head-up display (HUD) that is displayed in the forward line of sight of the pilot looking out the front windshield of the aircraft. The pilot typically enters or selects a taxi path that has been approved by ground controllers. The taxi path or route is then displayed on the HUD. The pilot can view the features displayed on the HUD as being overlaid on the surface features the pilot can normally see through the windshield. However, in poor visibility conditions, the pilot can still view the airport features displayed on the HUD. The airport features give a pilot situational awareness of where the aircraft is relative to the selected taxi path.

A key aspect to a practical avionics implementation for surface guidance must generally include a communications bus or data link for transmitting the large amounts of data required to adequately represent airport features on a display screen. An obstacle for the practical implementation of an airport feature display system is the requirement to clearly display airport features, preferably with taxi instructions and other useful symbology conformal to the pilot's view out the front windshield. Data representing airport features can also consume large amounts of memory. The problem is more acute since the data for many airports must be stored in memory. In addition, prior airport feature display systems require a correspondingly high-speed communications bus to transmit the airport feature data to a display system (e.g., HUD). This requirement, coupled with the fact that many avionics systems have limited data storage capability and do not have high-speed buses, have stymied efforts to implement airport features on the existing HUD systems on many aircraft. One approach for displaying airport features has been to upgrade aircraft avionics systems with new equipment that has large data storage capability and high speed data buses. However, these systems must be designed, certified, integrated with the exiting avionics suite, and installed. All this makes such an upgrade very costly and, therefore, this approach is economically infeasible for many aircraft.

Any airport feature display system should be adequate not only to accomplish the task of displaying airport features, but to also make the displayed features useful and the system cost-effective. It is also desirable to design an airport feature display system that may be retrofit into existing aircraft avionics systems at minimal cost.

The continuing goal, therefore, is to find ways to reduce costs, reduce taxi errors, reduce taxi time, and improve airport efficiency.

SUMMARY OF THE INVENTION

To address the goals stated above and other goals, the inventive airport feature display system comprises a unique data interchange method for facilitating the commnunication of airport feature data through conventional data buses without the need to design or install new high speed data buses. For retrofit applications, the airport feature display system is compatible with many existing HUD systems with minimal modification.

According to one aspect of the present invention, the airport feature display system is integrated as an extension of the flight management system (FMS) which provides the enroute planning function for the aircraft. The FMS is already installed in many aircraft and the FMS comprises many of the components required to implement the airport feature display system of the invention. For example, an FMS comprises a processor, data storage devices, a user interface, and is in communication with multiple display systems such as a HUD.

Another aspect of the invention is reduced bandwidth requirements for communicating the data representative of airport features to the HUD. This is important for implementing a cost-effective feature display system on existing aircraft. Many existing communications buses between an FMS and a HUD do not have sufficient bandwidth to communicate the feature data. One example of such a bus is the electronic flight instrument system (EFIS) bus that typically communicates data between the FMS and the HUD. The present invention significantly reduces the necessary bandwidth. A high-resolution position coordinate for an airport monument is transmitted to the HUD. A high resolution coordinate requires two words of Aeronautical Radio, Inc. (ARINC) data. The invention transmits the remaining data coordinates as one word that represent a high resolution position, but are referenced to the airport monument (i.e., reference point). The invention thereby effectively reduces the required bandwidth by approximately one half. This is sufficient to enable the use of existing communication buses and significant cost savings.

It is clear that the invention is a significant improvement over the prior art systems. Further, those skilled in the art recognized that the invention is not limited to use with an FMS. Other processors, display screens, and data entry devices may be used to practice the invention.

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figure 1:
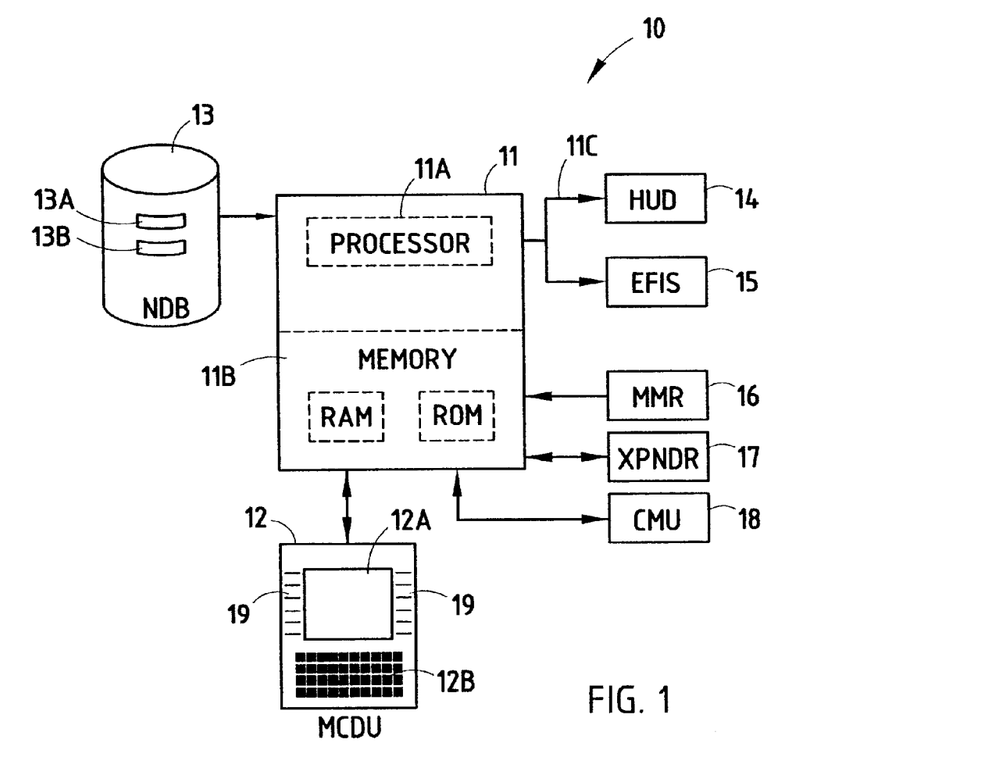
FIG. 1 is a block diagram of one embodiment of an airport feature display system according to the invention.

An exemplary embodiment of the airport feature display system according to the present invention is shown in FIG. 1, and is designated generally throughout by reference numeral 10. The components of the airport feature display system of the present invention will first be briefly described and then described in detail. The most common use for the invention is as an integrated element in the existing FMS and HUD of an aircraft, such as a commercial passenger or cargo jet, and therefore the following discussion will describe the invention in relation to such an application.

Referring to FIG. 1 there is shown a block diagram of an airport feature display system according to the invention and related aircraft systems. All of the aircraft systems can comprise the invention and, therefore, they are collectively referred to as airport feature display system 10. Airport feature display system 10 comprises flight management computer (FMC) 11, multifunction control display unit (MCDU) 12, navigation database (NDB) 13, head-up display (HUD) 14, electronic flight instrument system (EFIS) 15, multi-mode receiver (MMR) 16, transponder 17, and communications management unit (CMU) 18. FMC 11 and MCDU 12 are generally referred to collectively as a flight management system (FMS).

FMC 11 comprises a processor 11A, and memory 11B. Processor 11A may include any data processor suitable for receiving and processing commands and data. Processor 11A is preferably a microprocessor with sufficient data processing power to complete the required FMS and airport features tasks in real-time. Memory 11B preferably comprises both random access memory (RAM) for storing dynamic data and variables, and read-only memory (ROM) for storing program data and static data. Processor 11A communicates with memory 11B to retrieve program instructions and data and to manipulate and store and retrieve variables. Processor 11A is also in communication with NDB 13.

NDB 13 comprises airport and taxi route data describing airport runways, taxiways, gates, ramps, standard taxi routes and various other airport structures and desired features. The airport data 13A is preferably stored as a linked list and standard taxi routes 13B are also stored in the database. However, the data may also be stored in many other formats as desired. NDB 13 is preferably rewritable or replaceable so that the airport data and standard taxi route data is easily updated as needed and so that the data remains current regarding changes to airport runways, taxiways, construction, and the like. NDB 13 is constructed of any of various memory storage technologies such as PROM, EPROM, EEPROM, magnetic disk drives, optical disk drives, or various combinations of these and similar devices. The operative requirement merely being the capability to store the airport data.

The user interface is preferably accomplished through MCDU 12 which communicates with FMC 11 and processor 11A. MCDU 12 comprises a display screen 12A, line select keys 19, and a key pad 12B. MCDU 12 is commonly used to enter enroute flight planning commands to the FMC 11 and to output enroute flight data to the pilot, crew, or operator via display screen 12A. The operation of line select keys 19 allow quick selection and deletion of displayed items. The invention preferably uses this preexisting user interface device to accomplish the user interface for ground navigation at airports, although other user interfaces may also be used to practice the invention. For example, other displays such as the EFIS 15 or HUD 14 may be used as part of the user interface if desired.

HUD 14 and EFIS 15 are shown in communication with FMC 11. HUD 14 projects an image to a combiner positioned along the forward line-of-sight of the pilot such that a pilot can view the image and simultaneously look out the front windshield of the aircraft. EFIS 15 (also referred to as a head-down display (HDD)) is typically positioned below the front windshield of the aircraft. EFIS 15 comprises one or more display screens which are typically implemented using cathode ray tubes (CRTs), flat panel displays, or functionally similar display devices. The airport features are preferably displayed to the pilot on the HUD 14 which is the display of choice for this type of conformal display. The EFIS 15 may be used also. The EFIS 15, HUD 14, and MCDU 12 each have display screens that may be used to practice the invention.

Several communications systems are also coupled to the FMC 11. MMR 16 receives navigation or position signals such as global positioning system (GPS) signals, differential GPS (DGPS), local area augmentation system (LAAS) signals, wide area augmentation system (WAAS) signals, and the like. These signals are communicated to the FMC 11 where the position of the aircraft is determined. This aircraft position information, or similar information from other sources, is then used to compute appropriate airport feature data or is communicated to other aircraft systems.

Transponder 17 and CMU 18 provide additional input and output communications channels. Transponder 17, for example, may receive signals such as automatic dependent surveillance broadcast (ADS-B) from other aircraft or from air traffic control (ATC). This information may be used to add symbology indicative of other vehicle's location and movement to the airport features display. CMU 18 comprises a data link with ATC or similar controlling authority through which taxi routes, plans, and instructions are communicated, negotiated, modified, and approved or denied.

There exist many communications standards in the aviation community, and particularly in the field of avionics. Aeronautical Radio, Inc. (ARINC), of 2551 Riva Road, Annapolis, Md., publishes a variety of standards relating to aircraft avionics. Two such publications disclose aviation communications standards. ARINC 429 is a standard relating to a communications bus frequently used on aircraft. ARINC Characteristic 702A is entitled "Advanced Flight Management Computer System" was published Dec. 31, 1996, and relates to, among other things, the communication protocols between an FMS and a display system. Both of these publications are hereby incorporated by reference.

Figure 2:
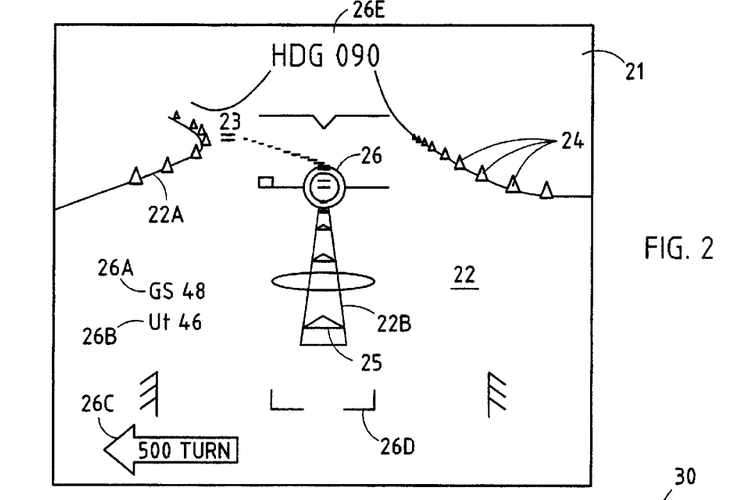
FIG. 2 is a sample airport feature display on a HUD screen.

FIG. 2 is a sample display of airport feature symbology on a HUD according to the invention. Looking through the combiner 21, which is the display screen of a HUD system, the pilot views the paved runway 22, the runway edge 22A, the runway centerline 22B, and the turnoff or taxiway connector 23 pavement. The airport feature symbology displayed on screen 21 comprise runway and taxiway edge cones 24 and taxi path symbols 25. Other displayed symbology comprises flight path guidance cue 26, ground speed 26A, target speed 26B, next turn indicator with distance readout 26C, main gear envelope symbol 26D, and heading 26E. Symbology is preferably conformal with the ground features.

The symbology displayed using the airport feature data depicts the pavement outlines of the runway and taxiways. The positions (i.e., position locations or coordinates) of the symbology are absolute latitude/longitude coordinates using twenty (20) bits of data in the BNR format that is referenced in the ARINC specifications. It will be noted that twenty (20) bits of data occupies one word in the ARINC format and is not considered high resolution for such an application. The ARINC specifications provide for more accurate latitude/longitude values that occupy two words in the format. However, it was found that transmitting all of the airport feature data in a high resolution format requires too much bandwidth on most buses. The instant invention solves this problem by communicating one high resolution coordinate/position to the HUD 14 and computing the remaining symbology location points to be relative to the one high resolution coordinate. It is preferred that the high resolution coordinate is a fixed location or monument on the airport. Therefore, the remaining airport feature data is computed to be positioned relative to the airport monument or reference data 30. Using this technique substantially reduces the required bandwidth to transmit airport feature data and enables the airport feature display system to be practiced on many avionics systems currently in service.

Figure 3:
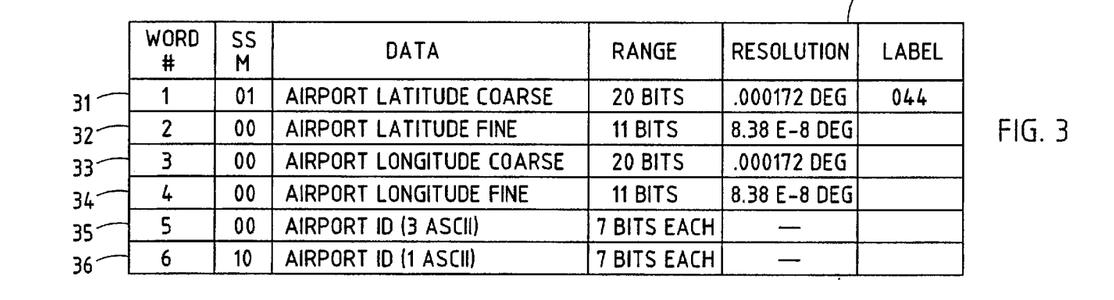
FIG. 3 is a sample airport reference location format according to the invention.

FIG. 3 illustrates a sample format for such an airport monument or reference data 30. The high resolution latitude data for the monument is transmitted in words 1 and 2 of the reference data 30. Next, the high resolution longitude for the monument is transmitted in words 3 and 4 of the reference data 30. Finally, if an airport ID is desired, four ASCII characters are transmitted in words 5 and 6 of the reference data 30. Airport elevation may also be transmitted in the reference data 30, but it is available from the FMS database or other sources and these other sources are preferred to save bandwidth on the communications bus.

Figure 4:
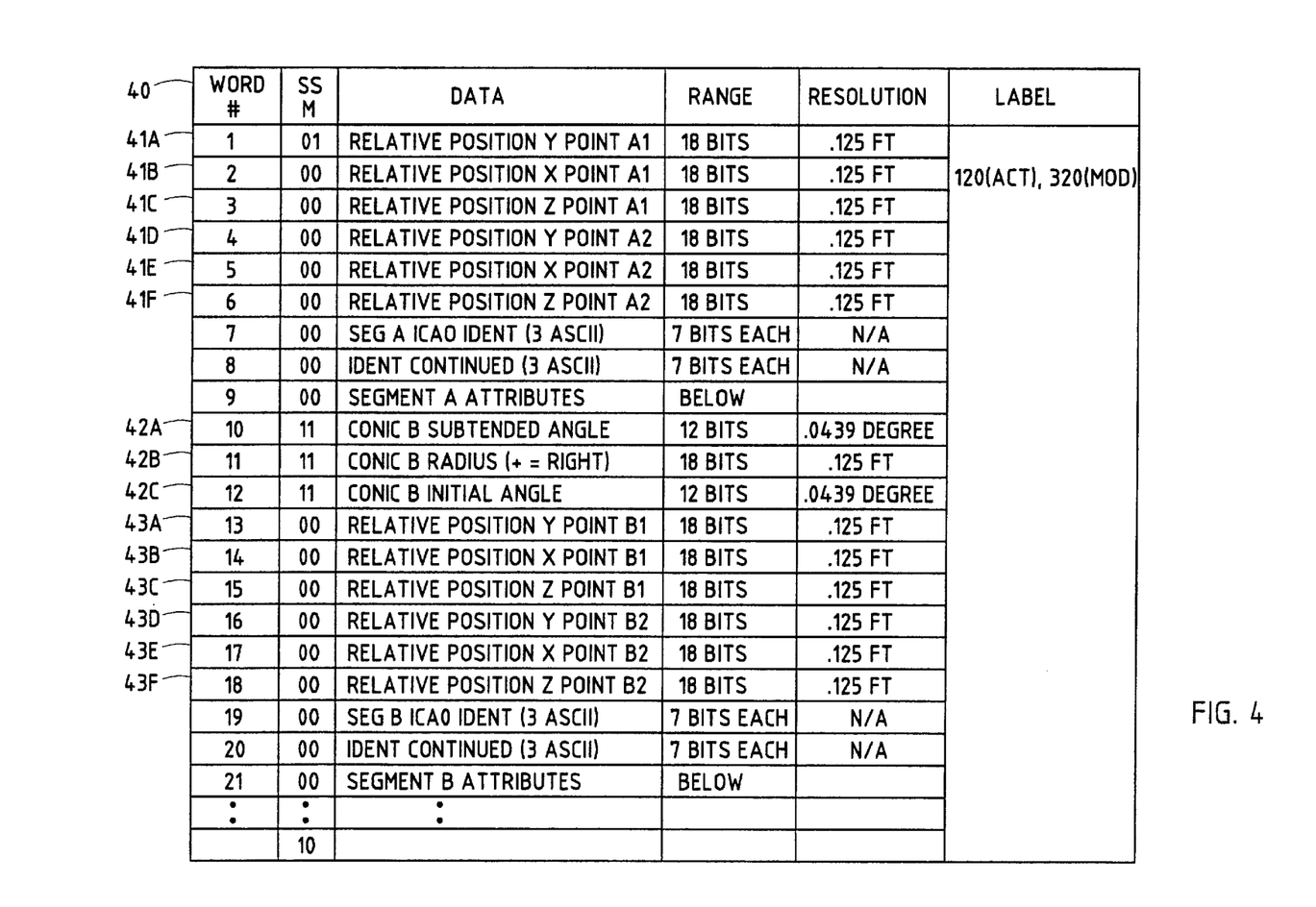
FIG. 4 is a sample taxi path format according to the invention.

FIG. 4 illustrates a sample format for transmitting airport feature data to a HUD according to the invention. The relative X, Y, Z data referred to as words 1–3 in the table 40, are formatted single word data values. However, the HUD 14 translates these low resolution format data values into high resolution position locations or coordinates by combining the low resolution format data values with the airport monument or reference data as is described below in reference to FIG. 7. According to one embodiment, using the relative position of the data points reduces by approximately one half the number of data words required to specify a location point or coordinate. This equates to a reduced bandwidth required to transmit the data. The data in table 40 corresponds to the taxi path diagram in FIG. 5. Only three words 41A, 41B, and 41C are needed to specify the location and elevation of point A1. Similarly, only three words are needed to specify the location and elevation of points A2, B1, and B2. Using the present invention, high resolution coordinates are communicated across data buses using one half the bandwidth normally required.

Figure 5:
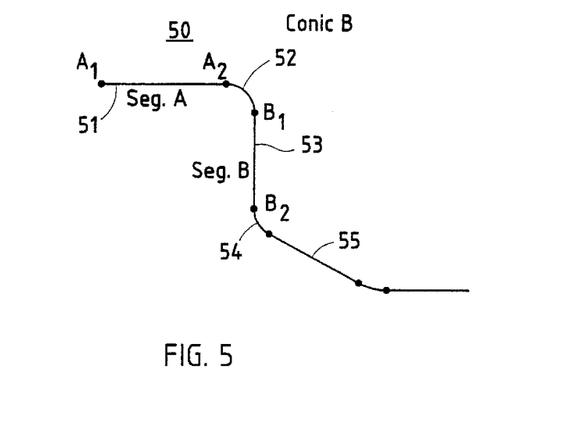
FIG. 5 is a taxi path segment corresponding to the taxi path sample of FIG. 4.

Referring to FIG. 5 there is shown a representative taxi path that is initially described in table 40. Segment A is defined by words 1–6 in table 40. Conic B is defined by words 10–12 in table 40 and segment B is defined by words 13–18 in table 40.

Figure 6:
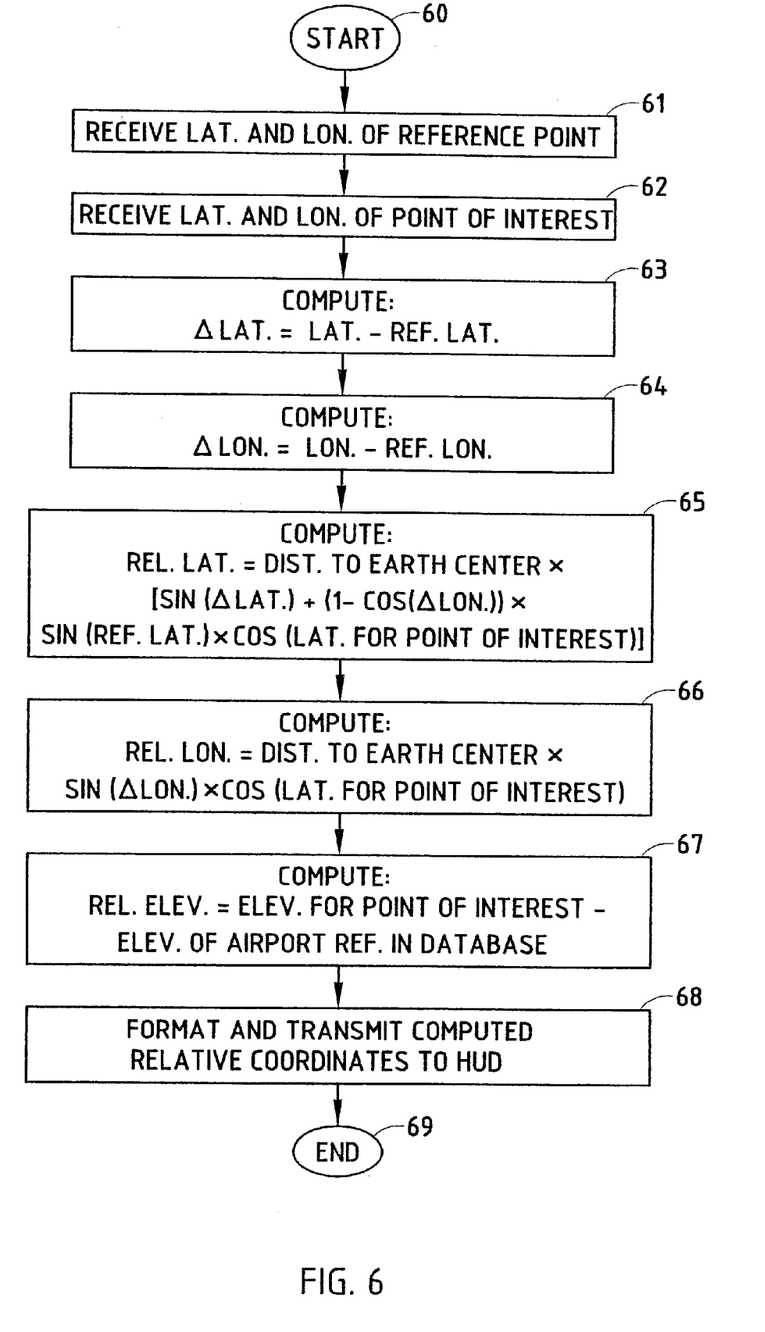
FIG. 6 is a flowchart of an algorithm for computing the relative latitude/longitude coordinates of airport features according to the invention.

FIG. 6 is a flowchart of a process for computing the relative position of the X (longitude), Y (latitude), and Z (elevation) coordinates for airport features. Starting in block 60, the process proceeds to blocks 61 and 62 where the latitude and longitude high resolution airport monument data is received and the latitude and longitude high resolution point of interest data is received. Δ(Delta) lat. is computed as the difference between the latitude of the point of interest and the latitude of the airport reference or monument in block 63. The similar computation is done in block 64 for Δlon. Next, the relative latitude is computed using the formula in block 65. The relative longitude is computed using the formula in block 66. Finally the relative elevation, or elevation, is computed using the formula in block 67. With the relative position point computed, the data is loaded into an appropriate format and transmitted to the HUD.

Figure 7:
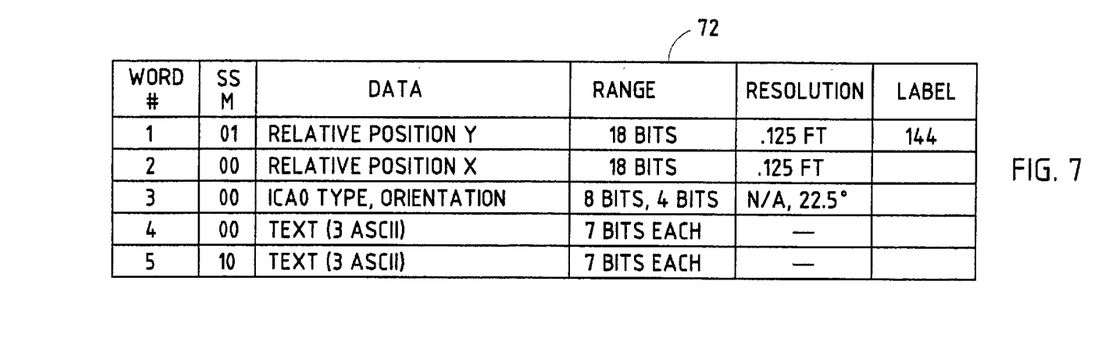
FIG. 7 is a sample airport signage and surface identification format according to the invention.

Referring to FIG. 7 there is shown another example of the format of the current invention. Table 70 comprises two data words representing the X and Y coordinates for signage. For signage and certain other features, no elevation value is required and the additional bandwidth is preserved for other uses.

It will become apparent to those skilled in the art that various modifications to the preferred embodiment of the invention as described herein can be made without departing from the spirit or scope of the invention as defined by the appended claims.

The invention claimed is:

1. An airport feature display system for an aircraft, said airport feature system comprising:
   a user interface comprising:
      a display screen, and
      a taxi route selection input;
   a data storage device capable of storing airport feature data;
   a processor in communication with said display screen and said taxi route selection input, wherein said processor generates formatted airport feature data comprising location points computed relative to a reference point; and a communications link in communication with said processor and capable of conducting airport feature data formatted by said processor.

2. The airport feature display system of claim 1, wherein said reference point is an airport monument.

3. The airport feature display system of claim 1, wherein said location points are representative of latitude and longitude coordinates.

4. The airport feature display system of claim 1, wherein said airport feature data comprises data representative of a runway and a taxiway.

5. The airport feature display system of claim 1, wherein said airport feature data comprises data representative of a taxi route.

6. The airport feature display system of claim 1, wherein said user interface comprises a head-up display (HUD) control panel.

7. The airport feature display system of claim 1, wherein said user interface comprises a dual use input that activates the display of airport feature data when a taxi related page is active.

8. The airport feature display system of claim 1, wherein said data storage device stores a predefined standard taxi route.

9. The airport feature display system of claim 1, wherein said display screen is a head-up display (HDD).

10. The airport feature display system of claim 1, wherein said display screen is a head-up display (HUD).

11. The airport feature display system of claim 1, wherein said user interface comprises a multifunction control display unit.

12. The airport feature display system of claim 1, wherein said processor is a flight management computer.

13. A method of airport feature data interchange in an aircraft comprising the steps of:

obtaining the coordinates of an airport reference location;

obtaining the coordinates of a feature;

communicating said reference location to a display device;

computing relative feature coordinates of said airport feature relative to said airport reference location; and communicating said relative feature coordinates to said display device.

14. The method of airport feature data interchange of claim 13, wherein said reference location is an airport monument.

15. The method of airport feature data interchange of claim 13 further comprising the step of computing said relative feature coordinate as a function of airport reference coordinates, and distance to earth center.

* * * * *

UNITED STATES PATENT AND TRADEMARK OFFICE
CERTIFICATE OF CORRECTION

PATENT NO.    : 6,731,226 B2
DATED         : May 4, 2004
INVENTOR(S)   : Randy L. Walter It is certified that error appears in the above-identified patent and that said Letters Patent is hereby corrected as shown below:

Column 7,
Line 26, "head-up" should be -- head-down --.

Signed and Sealed this

Twenty-seventh Day of July, 2004

JON W. DUDAS
*Acting Director of the United States Patent and Trademark Office*